(12) United States Patent
Razzell (10) Patent No.: US 11,184,203 B2
(45) Date of Patent: Nov. 23, 2021

(54) SYSTEMS AND METHODS FOR IDENTIFYING POLARIZATION/QUADRATURE CHANNELS IN DUAL-POLARIZATION COHERENT OPTICAL TRANSMISSION

(71) Applicant: Maxim Integrated Products, Inc., San Jose, CA (US)

(72) Inventor: Charles Razzell, Pleasanton, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 0 days.

(21) Appl. No.: 17/075,129

(22) Filed: Oct. 20, 2020

(65) Prior Publication Data

US 2021/0184903 A1  Jun. 17, 2021

Related U.S. Application Data

(60) Provisional application No. 62/947,518, filed on Dec. 12, 2019.

(51) Int. Cl.
*H03C 3/00* (2006.01)
*H03K 7/06* (2006.01)
*H04L 27/12* (2006.01)
*H04L 27/20* (2006.01)
*H04L 27/227* (2006.01)

(52) U.S. Cl.
CPC .......... *H04L 27/20* (2013.01); *H04L 27/2278* (2013.01)

(58) Field of Classification Search
CPC ............................ H04L 27/20; H04L 27/2278
USPC ............................................................ 375/302
See application file for complete search history.

(56) References Cited

U.S. PATENT DOCUMENTS

| | | | |
|---|---|---|---|
| 6,163,567 A | 12/2000 | Hatch | |
| 8,559,828 B2 | 10/2013 | Mo et al. | |
| 9,674,562 B1* | 6/2017 | Spracklen | H04N 21/4622 |
| 2003/0112851 A1* | 6/2003 | Aust | H04B 1/707 375/141 |
| 2004/0105512 A1* | 6/2004 | Priotti | H04L 27/2662 375/340 |
| 2018/0054294 A1* | 2/2018 | Rappaport | H04B 17/104 |

OTHER PUBLICATIONS

Xudong Li et al., "Existence of ternary perfect sequences with a few zero elements," Proceedings of the Fifth International Workshop on Signal Design and Its Applications in Communications, Guilin, 2011, pp. 88-91, doi: 10.1109/IWSDA.2011.6159448. (4 pgs).

* cited by examiner

*Primary Examiner* — Tanmay K Shah
(74) *Attorney, Agent, or Firm* — North Weber & Baugh LLP; Michael North (57) ABSTRACT

Described are systems and methods for identifying the phase and polarization of independent modulation streams in quadrature channels of a coherent transmission system by using digital code. As a result, phase rotation and polarization of streams that during transmission may have become rotated and swapped around in the channel are correctly labeled and depermuted according to a known and predictable order.

20 Claims, 9 Drawing Sheets

| Rotation | I-branch contains | Q-branch contains |
|---|---|---|
| 0 | $I$ | $Q$ |
| 90 | $Q$ | $-I$ |
| 180 | $-I$ | $-Q$ |
| 270 | $-Q$ | $I$ |

FIGURE 9

SYSTEMS AND METHODS FOR IDENTIFYING POLARIZATION/QUADRATURE CHANNELS IN DUAL-POLARIZATION COHERENT OPTICAL TRANSMISSION

CROSS REFERENCE TO RELATED PATENT APPLICATIONS

This application is related to and claims the priority benefit, under 35 U.S.C. § 119(e), from U.S. Provisional patent application, Ser. No. 62/947,518 entitled "Systems and Methods for Identifying Polarization/Quadrature Channels in Dual-Polarization Coherent Optical Transmission," filed on Dec. 12, 2019 and listing as inventor Charles Razzell. Each reference mentioned in this patent document is incorporated by reference herein in its entirety and for all purposes.

BACKGROUND

The present disclosure relates generally to signal processing in high-speed communication circuits. More particularly, the present invention relates to systems and methods for correctly identifying polarization and quadrature channels in coherent optical transmission schemes.

In the past few decades, telecommunication networks have seen an ever-increasing demand for bandwidth. Large available bandwidth is a major factor in the increasing popularity of high-speed optical communication systems—whether for transferring data chip-to-chip or between Wide Area Network (WAN) fiber-optic links. For example, optical transceivers designed for short-distance (few hundred meters) interconnects over optical fiber are in high demand in data center and campus networks.

Coherent optical links communicate data over different channels that correspond to different phases and polarization sates of an input signal to the optical fiber. For example, in a dual-polarization coherent optical transmission system, X- and Y-polarization channels, ideally, carry independent in-phase (I) and quadrature phases (Q) of the X- and Y-polarizations, conventionally denoted as tributaries XI, XQ, YI and YQ—one for each branch. Using 4-PAM on each branch, yields two bits for every modulation unit interval (UI), and the combination of all four branches yields a total of 8 bits per UI.

However, characteristics that are inherent to the transmitter, receiver, and optical fiber introduce delays that cause phase and polarization in the four channels to arrive at the receiver with unknown phase rotation and polarization state that the receiver cannot identify from the recovered information. While by applying suitable signal processing to the four received streams of information, one may ensure the streams are received with a high degree of orthogonality, i.e., the data streams are successfully unmixed, thus, yielding separate information, a remaining ambiguity lies in the fact that the X- and Y-streams may have been flipped, inverted, and swapped around in arbitrary ways. For example, a 180° rotation in a channel amounts to negating the signal. Because each individual XI, XQ, YI, and YQ stream may have been independently rotated by 90°, 180°, or 270°, there is no easy way to identify the four sets of independent information, even if the data itself is perfectly valid. This results in 1+2+2=5 bits of uncertainty when identifying 4 output channels at the receiver and, thus, an unwanted permutation of the recovered data is highly likely.

Some existing approaches add a pilot tone at the transmitter to one or more branches to aid in proper identification of individual channels. Yet, such approaches have several shortcomings, including that the added pilot tones can interfere with other signals, such as for example those for lasers that perform signal tracking. Further, the polarity of a pilot tone, typically a sine wave, remains unknown because, unless additional timing information is made available, the pilot tone looks exactly like its negation.

Accordingly, it is desirable to have systems and methods that overcome the shortcomings of existing approaches and provide solutions for properly identifying and descrambling individual modulation streams.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items. All documents cited herein are incorporated by reference herein in their entirety.

It is noted that embodiments described herein are given mainly in the context of analog receivers and binary PN codes. Yet, one skilled in the art shall recognize that the teachings of the present disclosure are not limited to analog applications or to any type of code as digital signal processing (DSP) coherent receivers may also be used. Similarly, nonbinary digital codes, such as cyclically repeating ternary code, or M-ary modulation sequences over any arbitrary size of modulation alphabet, M, may equally be used.

Figure 1:
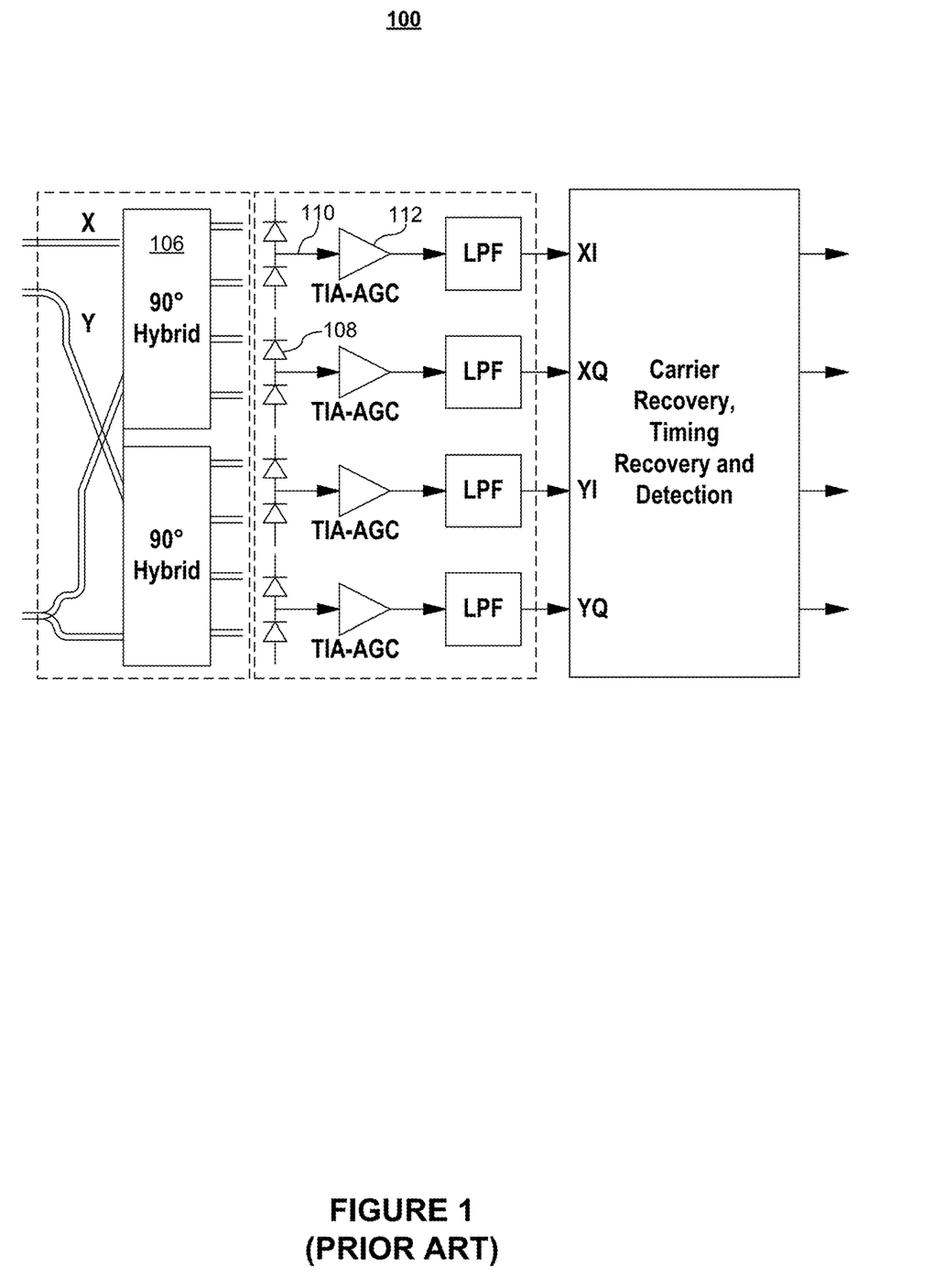
FIG. 1 is a block diagram of a conventional dual polarization quaternary amplitude modulation (DP-QAM) receiver architecture that is based on analog signal processing.

FIG. 1 is a block diagram of a conventional DP-QAM receiver architecture that is based on analog signal processing. Receiver 100 is a homodyne receiver driven by an on-channel laser (not shown) that acts as the local oscillator. The arrangement of the polarization beam splitter and 90° hybrids 106 is designed to provide balanced quadrature light outputs for each of the two orthogonal polarizations, conventionally labeled X and Y, which are incident on eight photodiodes 108 that are arranged in balanced pairs. This arrangement results in four bipolar photocurrents 110 that are amplified by respective Trans Impedance Amplifiers (TIAs) 112, corresponding to I- and Q-phases of the X- and Y-polarizations, respectively. Thus, four branches of receiver 100, i.e., XI, XQ, YI, YQ, are available for further signal processing in the analog domain.

However, imperfections inherent to the transmitter, receiver 100, and optical fiber introduce unwanted delays and distortions. One type of distortion that a polarized optical input beam that passes through an optical fiber plant experiences relates to undesirable changes to the state of polarization (SOP) of the signal that occur during transmission. Once polarization and phase in the four channels are mixed into each other, they arrive at the receiver with random phase orientations and unknown phase polarization dimensions with no reference point that would allow one to identify a valid signal. As a result, the receiver may not correctly identify the recovered information, leading to data loss.

In order to avoid having to manipulate polarization states in the DSP domain, some designers have proposed implementing polarization control by using optical modulators. To facilitate this, a pilot or marker tone is added at the transmitter to label and track one of the phases of the two polarizations (e.g., the X-polarization, in-phase signal branch) as a reference, such that a control loop algorithm running in a low-power CPU can monitor and adjust the polarization states to correct for polarization rotations in two or three degrees of freedom.

A pilot tone (e.g., a 50 kHz sinusoidal signal) that has been superimposed onto the XI tributary at the transmitter is used to recover the SPO at the receiver, which low-pass filters the XQ, YI, and YQ signals and synchronously detects these signals in the four branches. Thus, the receiver monitors the amplitudes and signs of these signals, while assuming that carrier phase lock has already been achieved. Low-speed signal processing can then be used to adjust the polarization angles to reduce the unwanted pilot tone amplitudes, such that the receiver can compensate for polarization rotation in the fiber. However, this approach suffers from a number of drawbacks, including that marker tone detection is possible only after carrier phase recovery and that the carrier recovery depends on the polarization states having first been corrected, for example, to ensure that a QPSK constellation is available for detection.

Accordingly, there is a need for systems and methods that allow for reliable identification of polarization channels in coherent optical transmission systems.

Figure 2:
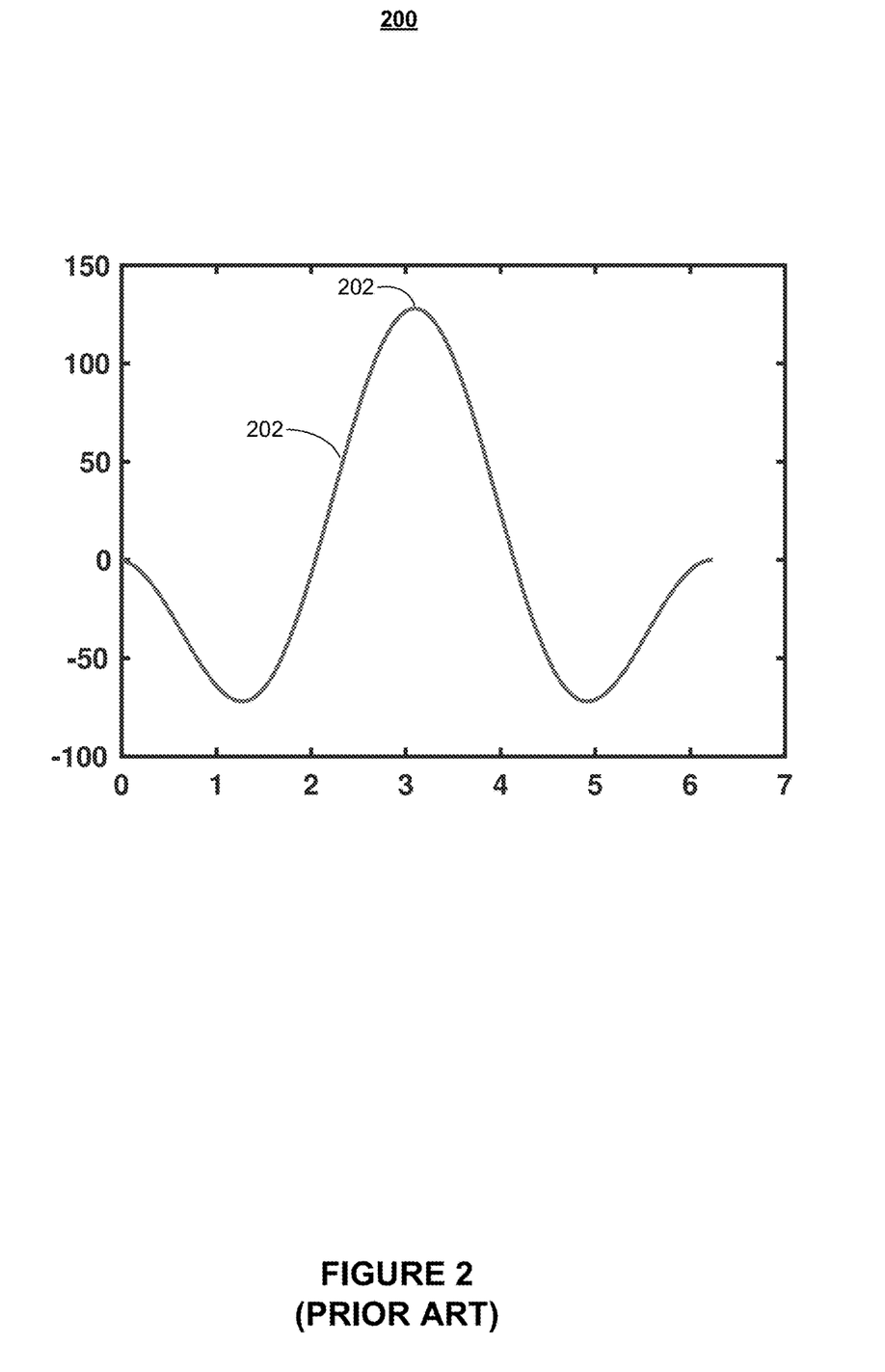
FIG. 2 shows the magnitude of an autocorrelation function of a common pilot signal utilized in existing designs.

FIG. 2 shows the magnitude of an autocorrelation function of a common pilot signal utilized in existing designs. As previously mentioned, certain approaches attempt to eliminate the uncertainty in identifying X- and Y-polarization channels by applying a single tone to the XI or XQ phase of the X-polarization channel to provide sufficient information to correctly identify the XI and XQ axes. However, such a single tone is insufficient for identifying the polarity of the transmitted signal since for sinusoidal pilot tones, the following mathematical expression holds true:

$\sin(\theta+\pi)=-\sin(\theta)$ and $\cos(\theta+\pi)=-\cos(\theta)$.

Since the absolute phase of the transmitted pilot tone may not be known, the polarity of the received tone cannot be identified with sufficient certainty. Considering a complex pilot signal formed as $p(t)=\cos(\omega t)+i \cdot \sin(2\omega t)$, the autocorrelation of p(t) has a unique peak absolute value 204 over $(\omega t)=0 \ldots 2\pi$. Because peak absolute value 204 of the autocorrelation function of p(t) is unique over $0 \ldots 2\pi$, the argument 202 of the correlation peak yields the channel rotation without ambiguity. However, as shown in FIG. 2, the correlation sidelobes of the autocorrelation function of the pilot signal are relatively large and only −2.5 dB relative to the peak value.

It is noted that the ideal waveform for detection should have a cyclic autocorrelation that closely approximates an impulse function, e.g., a Dirac delta impulse. However, since this cannot be achieved by using simple pilot tones, in embodiments, relatively long binary PN codes are added to the tributary (e.g., linearly combined by using a summer) to serve as an alignment code or a label, as will be discussed next. Advantageously, due to the length of the sequence, one may correlate 1000s of bits to positively identify the tributary and orientation with a high degree of certainty.

Figure 3:
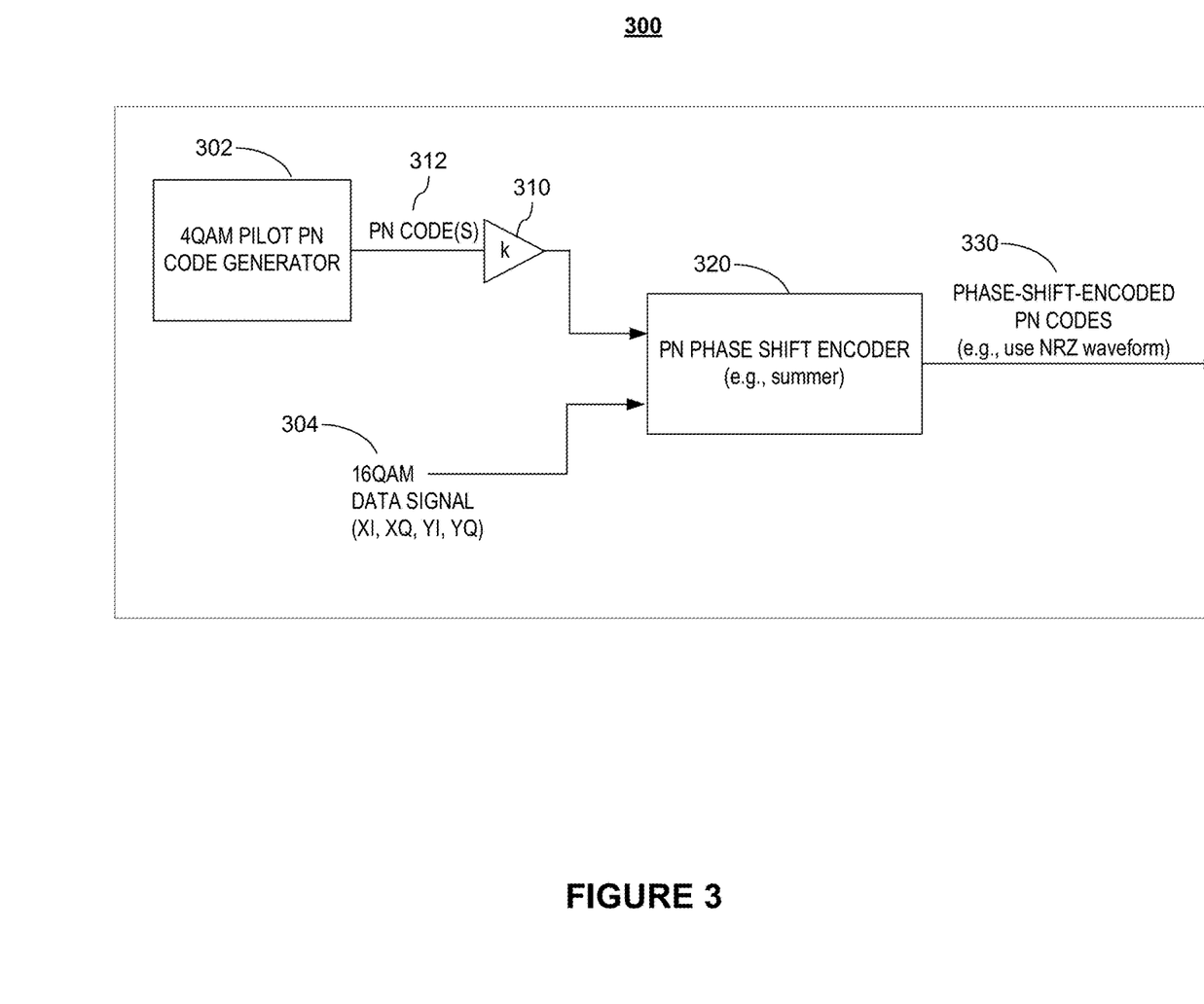
FIG. 3 illustrates an exemplary PN code generator according to embodiments of the present disclosure.

FIG. 3 illustrates an exemplary PN code generating system according to embodiments of the present disclosure. One skilled in the art will appreciate that PN code generating system 300 may be implemented, for example, within an optical transmitter. As depicted in FIG. 3, PN code generating system 300 comprises PN code generator 302, and PN phase shift encoder 320, which, in embodiments, may comprise a summing element. The PN code generating system illustrated in FIG. 3 is not limited to the constructional detail shown there or described in the accompanying text. For example, as those skilled in the art will appreciate, a suitable PN code generator need not be the 4QAM pilot PN code generator depicted in FIG. 3.

In operation, PN code generator 302 generates one or more PN codes that may be amplified (or attenuated) by gain element 310. PN codes 312 may be sequences of bits that comprise maximal length sequences. These sequences may be generated, for example, by using linear feedback shift registers that have maximal length. In embodiments, PN phase shift encoder 320 receives PN code 312 and data signal 304, e.g., a 16QAM data signal and, in response, sums PN code 312 with data signal 304, for example, in a predetermined proportion as determined by gain 310, or any other controlled factor, in order to output phase-shift-encoded PN codes 330. The phase-shift-encoded PN codes 330 may thus use different phases of the same PN sequence to label the four independent polarization/phase channels 304 of a coherent transmission system.

In embodiments, by using the same PN code 312 (or waveform) at distinct relative phase offsets, zero mutual interference may be obtained due to the "perfect" autocorrelation properties of PN code 312. For example, assuming a code length N, phase shift encoder 320 may encode XI, XQ, YI, and YQ of and data signal 304 with respective PN phase shifts of $$\frac{\{0, 2, 3, 4\}(N + 1)}{8}$$

chips. In embodiments, half of the possible cyclic positions may be left void to enable the beginning of the sequence to be deduced as the first significant correlation peak after gaps of at least (N+1)/2 PN chips.

As discussed below with respect to FIG. 5, in embodiments, signs of correlation peaks may be used to deduce phase rotation, assumed to be a multiple of 90°. In embodiments, the order of correlation peaks indicates whether X- and Y-polarization channels in signal 304 have been swapped during transmission.

In embodiments, two PN codes 312 may be generated that have identical length, but different generator polynomials. The codes 312 may be generated by choosing from predetermined polynomial pairs that have been tabulated for Gold codes, such the maximum cross-correlation for the codes 312 is limited to $|\theta(a, b)| \leq_1 +2^{(n+1)/2}$ for odd n and $|\theta(a, b)| \leq 1+2^{(n+2)/2}$ for even n. In embodiments, the first of a set of predetermined PN codes may be used to label the XI tributary, the other for the YI tributary. For example, for n=10, $$p1(z)=Z^{10}+Z^3+1; \quad p2(z)=Z^{10}+Z^8+Z^3+Z^2+1 \quad \text{and}$$
$$|\theta(a,b)| \leq 65$$

The duration of each chip of PN code 312 should be an integer multiple, m, of the modulation UI. It is noted that the number of UI's per PN chip may be increased to limit the processing speed of the matched filter detector to a manageable value.

In embodiments, PN pilot code 312 may use an NRZ waveform having an amplitude that is significantly lower than the 4PAM inner symbols, e.g., $\pm\frac{1}{16}$, where the 4PAM symbols are nominally ±1; ±3, such that a correlation between reference patterns of 255 NRZ bits may be used to uniquely identify the XI and YI streams; and the angle of the correlation coefficient may identify the rotation.

Figure 4:
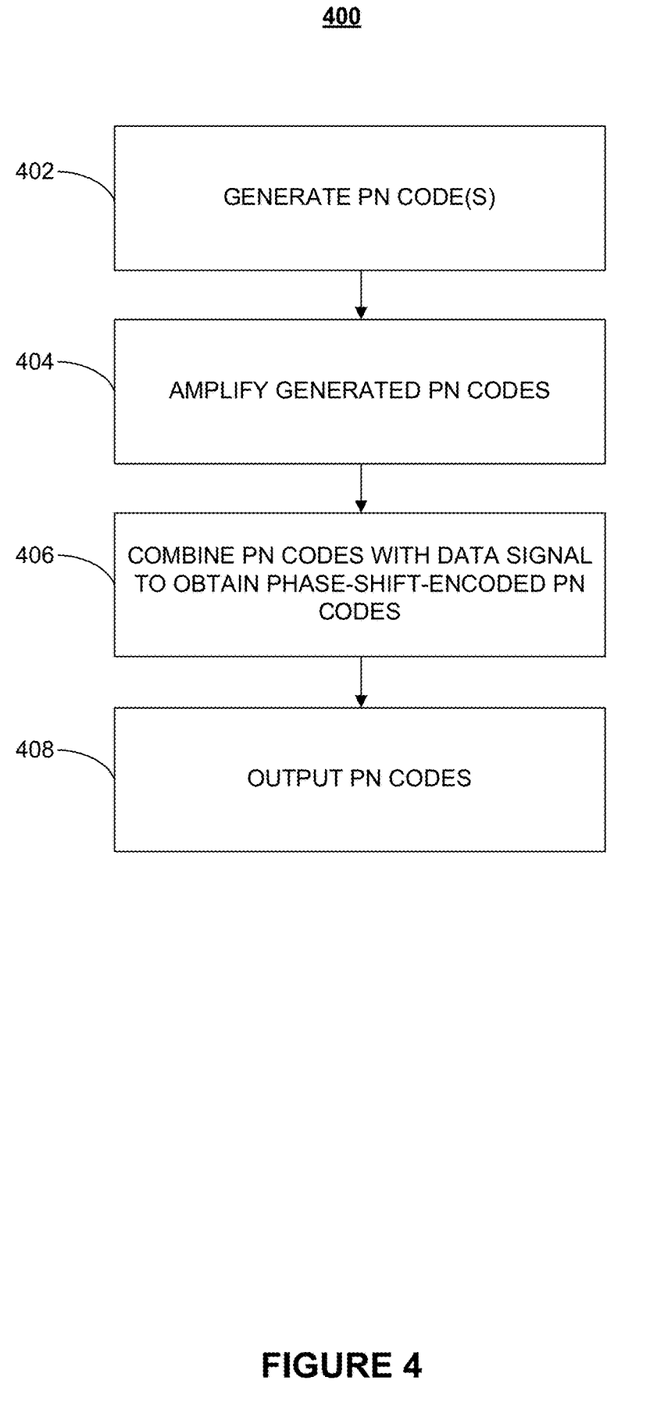
FIG. 4 is a flowchart of an illustrative process for generating PN codes for identifying the phase and polarization of independent modulation streams in quadrature channels according to embodiments of the present disclosure.

FIG. 4 is a flowchart of an illustrative process for generating PN codes for identifying the phase and polarization of independent modulation streams in quadrature channels according to embodiments of the present disclosure. In embodiments, process 400 begins at step 402 when, e.g., one or more PN codes are generated, for example, by a 4QAM pilot PN code generator.

In embodiments, at step 404, the one or more PN codes may be amplified by a gain. A relatively long (e.g., 1023 bit) binary PN code provides about 30 dB process gain.

At step 406, the one or more PN codes may then be combined with a data signal, such as a 16QAM data signal. In embodiments, an encoder may sum the PN code with the 16QAM data signal to obtain phase-shift-encoded PN codes that, at step 408, are output by the encoder as labeled modulated data signals that identify signal polarity and identity.

Figure 5:
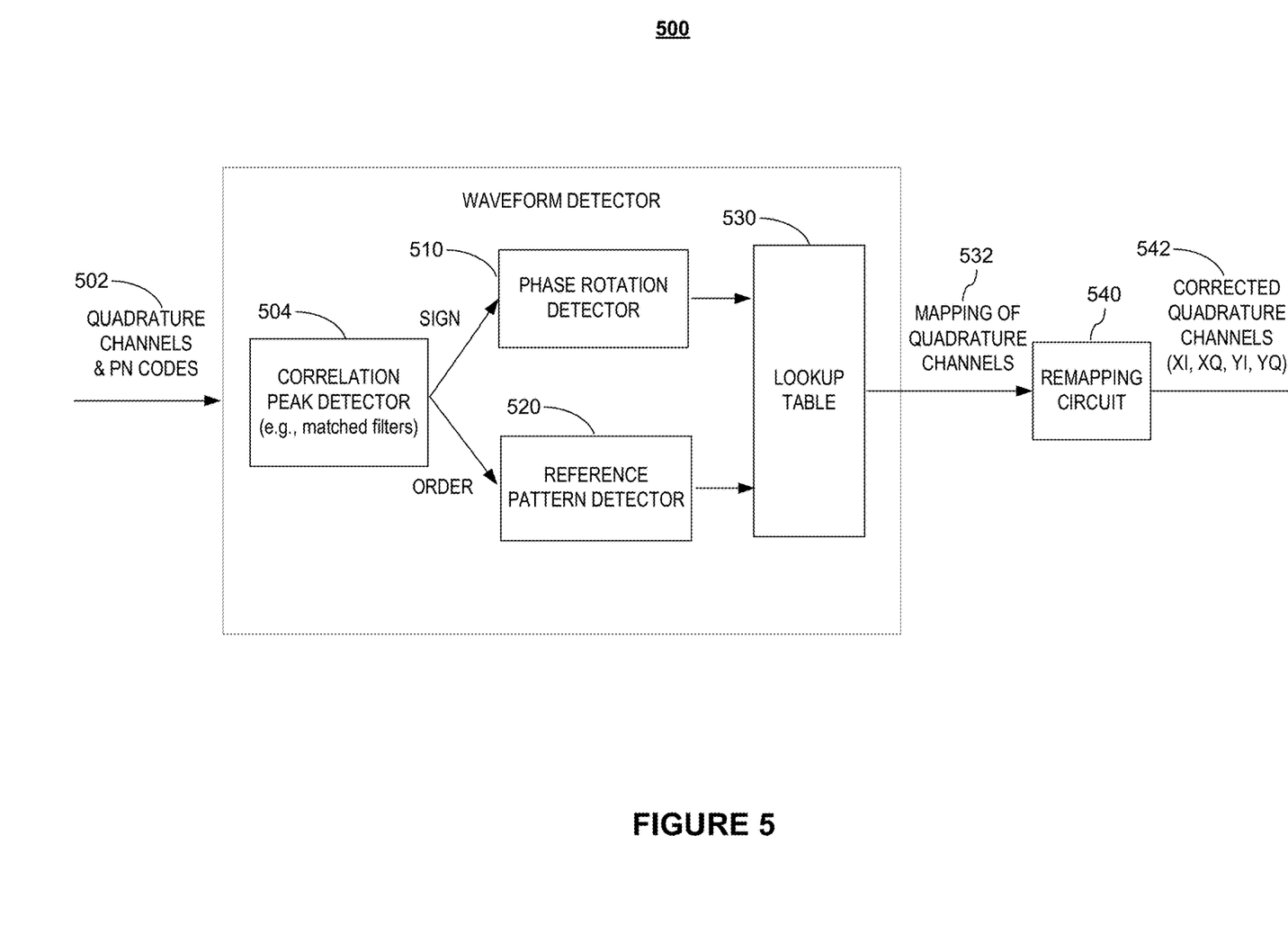
FIG. 5 illustrates an exemplary detecting system for identifying the phase and polarization of independent modulation streams in quadrature channels according to embodiments of the present disclosure.

FIG. 5 illustrates an exemplary detecting system for identifying the phase and polarization of independent modulation streams in quadrature channels according to embodiments of the present disclosure. One skilled in the art will appreciate that detecting system 600 may be implemented in an optical receiver. Detecting system 500 comprises correlation peak detector 504 that, in embodiments, may be implemented as a set of matched filters, phase rotation detector 510, reference pattern detector 520, lookup table 530, and remapping circuit 540. As with FIG. 3, the details of detecting system 500 depicted in FIG. 5 are not intended as a limitation on the scope of the present disclosure.

In operation, in response to receiving quadrature channel data and associated PN codes 502, correlation peak detector 504 generates a correlation function that phase rotation detector 510 may use to determine signs of correlation peaks and infer therefrom phase rotations in one or more quadrature channels.

PN codes tend to come in a length of 2'−1, where n is the number of bits in the shift register. Assuming a 15-bit shift register, the sequence will have 32,767 bits. Knowing the PN code that is being sent, various embodiments use correlation peak detector to detect a very strong pulse that results from a matching sequence. It is noted that it would be very hard to achieve such a match purely by accident. Advantageously, this creates a very sensitive detector. Further, due to the relatively low magnitude, e.g., at or below noise level that the receiver sees, this may be accomplished without changing the, e.g., 16-QAM data (I and Q) itself and without having to sacrifice actual bits sent through the channel, thus, not affecting the regular operation of the receiver, because the constellation points are disturbed by a relatively insignificant amount that has no practical consequences.

In embodiments, correlation peak detector 504 may be implemented as a sliding window correlator that uses PN codes 502 as an input signal and applies, e.g., via a multiplier circuit, a matched filter that may use the PN sequence as a set of tap weights such that, e.g., after passing through a sliding integrator, a peak can be detected once a the PN sequence matches the tap weights. In embodiments, correlation peak detector may utilize an FIR filter as a matched filter peak detector and set tap weights of the FIR filter according to PN codes 502 to detect a peak (see, e.g., FIG. 9). Since PN codes 502 may have a random phase relative to the PN generator, known CDMA receiver techniques may be used to scan and find an appropriate phase that delivers a peak. In embodiments, the "first" phase may be defined relative to an intentional gap in the correlation peaks designed to break the cyclic symmetry.

In embodiments, correlation peak detector 504 may further apply the correlation function to reference pattern detector 520 to obtain an order of correlation peaks that may be used to determine whether polarization channels in quadrature channel data 502 have been swapped and to map the quadrature channel data, e.g., by using remapping circuit 540, to correctly detect, identify, and unscramble the XI and YI data streams. In embodiments, remapping circuit 540 comprises a decision circuit that may use, e.g., threshold detection to perform remapping or depermutation operations according to the information provided by the order of the correlation peaks.

In embodiments, lookup table 530 may be used to obtain the actual ordering and signs to detect a new ordering or mapping that potentially has occurred. Remapping circuit 540, in effect, unscrambles the data streams. In embodiments, remapping circuit 540 may be implemented as a multiplexer that uses mapping 532 to ensure that the identified channels are properly (re)mapped to the output channels according to lookup table 530. In embodiments, remapping circuit 540 may comprise a switch matrix that applies the information in lookup table 530 to the channel data to accomplish remapping. In embodiments, remapping circuit 540 outputs corrected quadrature channels 542 that are correctly labeled and depermuted according to a known and predictable order.

Figure 6:
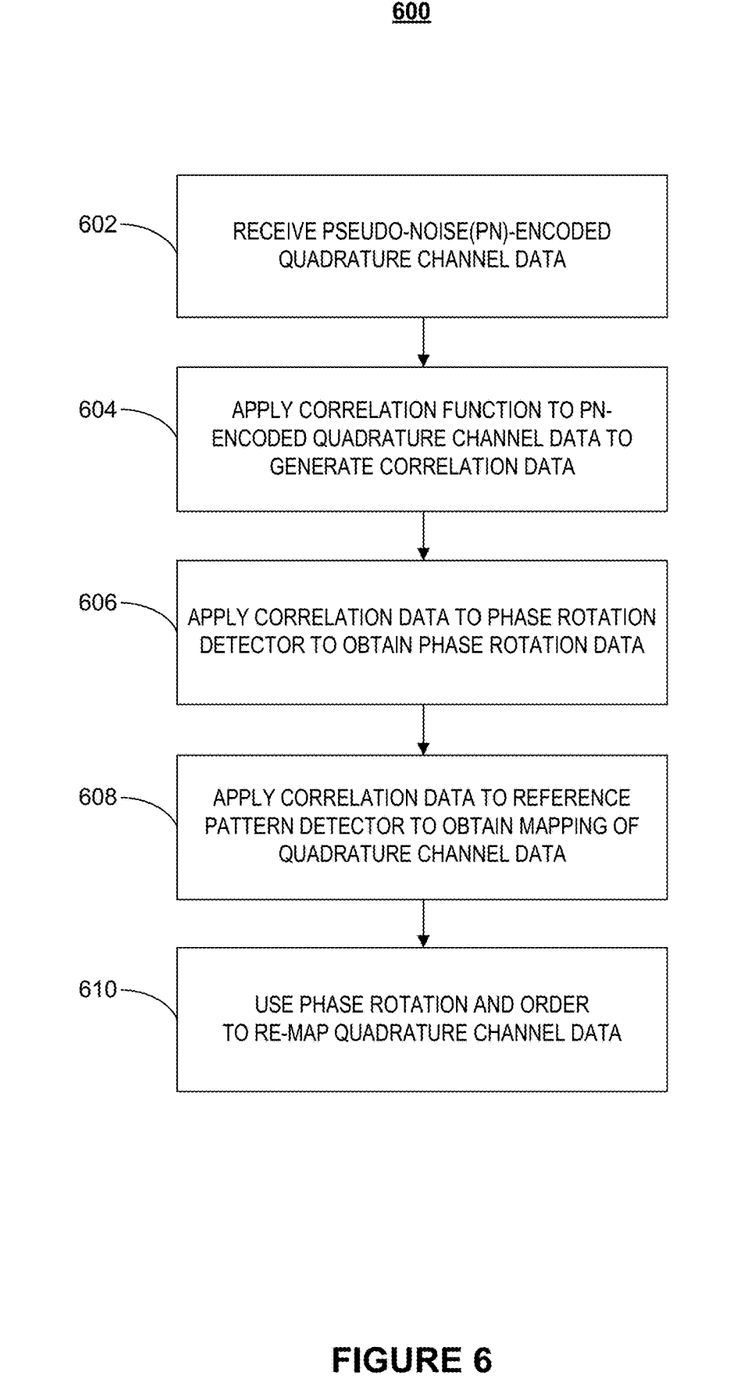
FIG. 6 is a flowchart of an illustrative process for generating PN codes for identifying the phase and polarization of independent modulation streams in quadrature channels according to embodiments of the present disclosure.

FIG. 6 is a flowchart of an illustrative process for identifying the phase and polarization of independent modulation streams in quadrature channels according to embodiments of the present disclosure. In embodiments, process 600 begins at step 602 when, quadrature channel data and associated PN codes are received by a correlation peak detector, e.g., matched filters.

At step 604, the correlation peak detector may apply a correlation function to generate correlation data.

At step 606, the correlation data may be applied to a phase rotation detector to obtain phase rotation data.

At step 608, the correlation data may be applied to a reference pattern detector to obtain a mapping of the quadrature channel data.

Finally, at step 610, the phase rotation and order is used to properly remap the quadrature channel data.

It is noted that certain steps may optionally be performed; steps may not be limited to the specific order set forth herein; certain steps may be performed in different orders; and certain steps may be performed concurrently. It is further noted that embodiments disclosed herein apply to analog and/or digital implementations since digital tuning systems and methods may equally take advantage of the teachings of the present disclosure to identify polarization and quadrature channel data.

Figure 7:
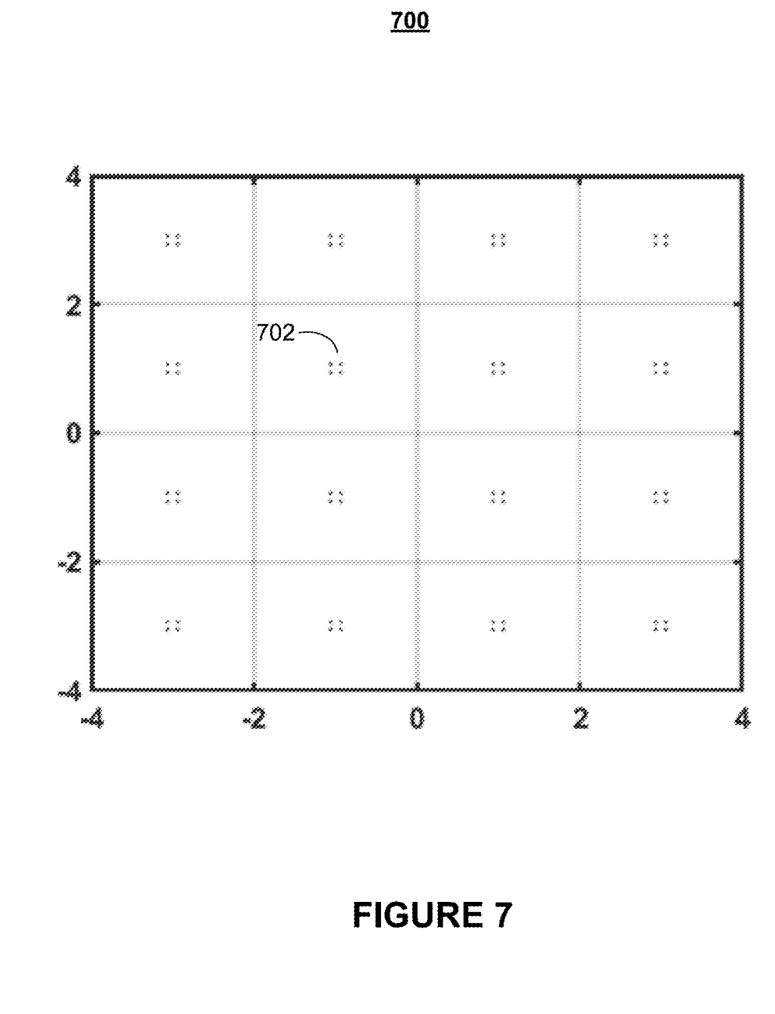
FIG. 7 illustrates how SNR degradation due to pilot codes affects constellation points in an exemplary 16-QAM constellation according to embodiments of the present disclosure.

FIG. 7 illustrates how SNR degradation due to pilot codes affects constellation points in an exemplary 16-QAM constellation according to embodiments of the present disclosure. Each of the 16-QAM constellation points 302 in FIG. 7 is modulated away from its nominal value by the 4-QAM pilot signal (NRZ in I & Q).

$$\text{Pilot } C/I = 10 \log_{10}(2/(10 \times 16^2)) = -31 \text{ dB}$$

The SNR including the pilot tone, assuming that the SNR of the receiver is 24 dB, is given by the expression:

$$-10 \log_{10}(10^{-24/10} + 2/(10 \times 16^2)) = 23.22 \text{ dB} \therefore SNR \text{ loss is } 0.78 \text{ dB}.$$

Figure 8:
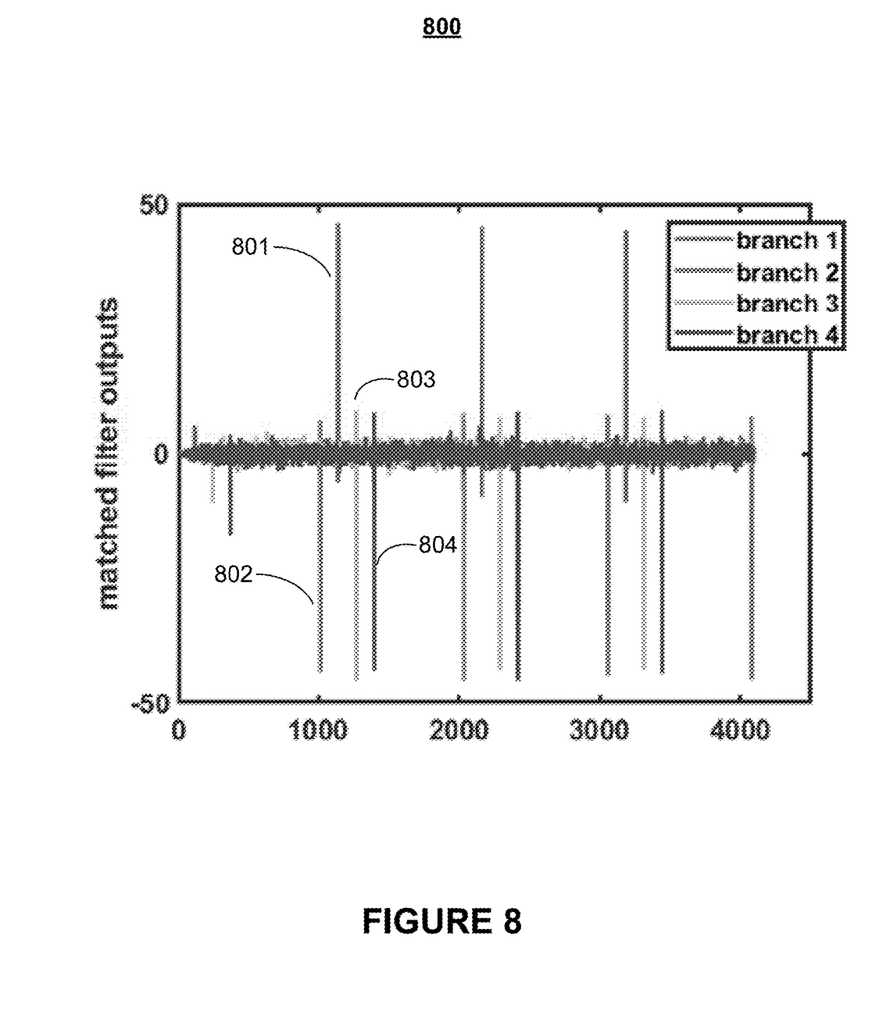
FIG. 8 shows the result of 50 simulations with random polarization using PN-pilot based stream recognition according to embodiments of the present disclosure.

FIG. 8 shows the result of 50 simulations with random polarization using PN-pilot based stream recognition according to embodiments of the present disclosure. Each simulation was run for $2^{18}$ 16-QAM symbols. It is noted that the experimental results are provided by way of illustration and were performed under specific conditions using a specific embodiment or embodiments. Accordingly, neither these experiments nor their results shall be used to limit the scope of the disclosure of the current patent document.

Figure 9:
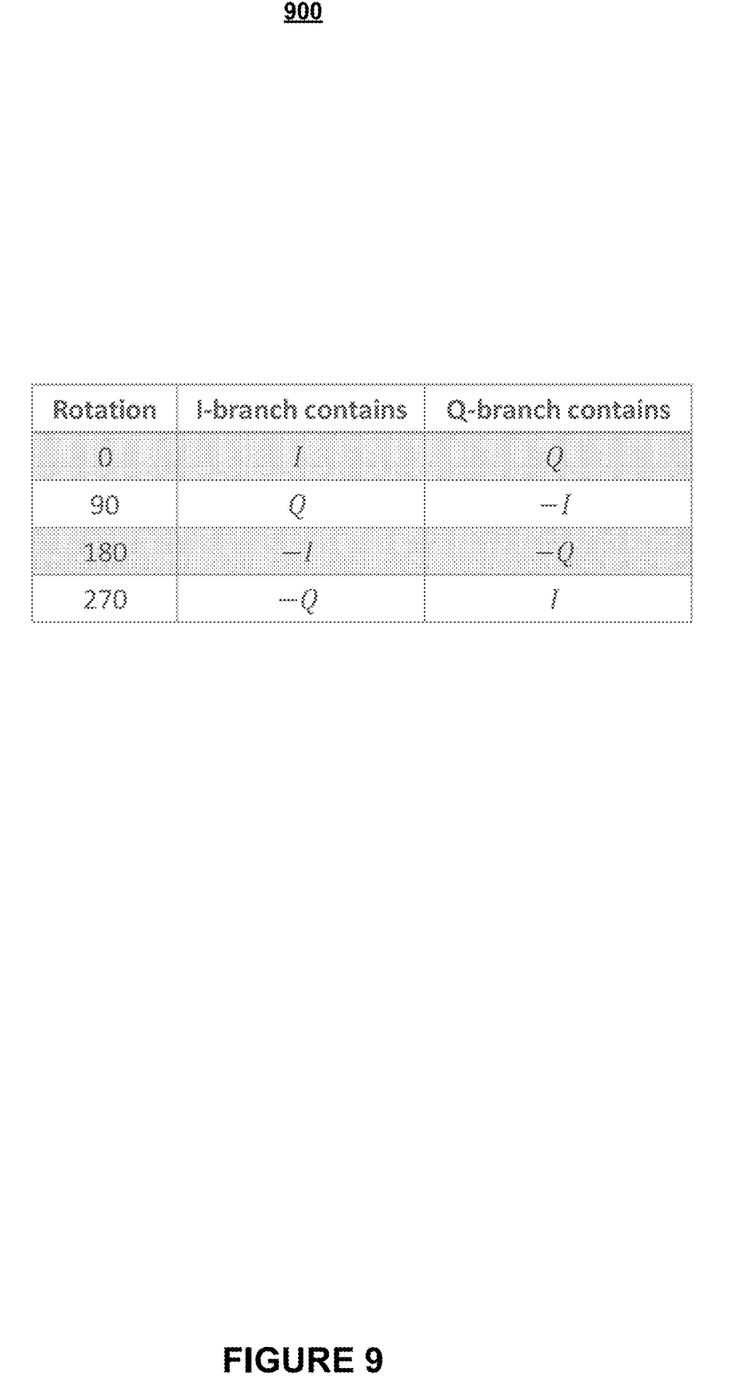
FIG. 9 is an exemplary truth table according to embodiments of the present disclosure.

Depicted in FIG. 8 are example outputs of four matched filters. For each receiver branch, branches 1-4, one output is shown. The order in which correlation peaks 801-804 occur after a gap may be seen as {2,1,3,4}, and the signs as {−, +, −, −}. This, together with truth table FIG. 9, provides sufficient information to determine whether X- and Y-polarizations have been swapped during transmission and to determine the rotation of each branch. The simulation results confirm that the method has minimal impact on BER. Scaling and other design parameters may be further optimized to ease hardware design concerns, such as the PN-code chip rate.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using Application Specific Integrated Circuits (ASICs), programmable arrays, digital signal processing circuitry, or the like. Accordingly, the terms in any claims are intended to cover both software and hardware implementations. The term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as ASICs, programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An encoding system for labeling the identity and polarity of modulated data streams that share a common channel, the encoding system comprising:
    a digital code generator that generates an output comprising a sequence of symbols that have a cyclic autocorrelation that substantially approximates an impulse function;
    an amplifier or attenuator coupled to the digital code generator to amplify or attenuate the output by a controlled factor; and
    a combiner coupled to the digital code generator, the combiner, in response to receiving a modulated data signal, combines the modulated data signal with the output to label the polarity and identity of the modulated data signal, the encoding system outputs labeled modulated data signals.

2. The encoding system according to claim 1, wherein the sequence of symbols comprises at least one of a binary pseudo-noise code, a ternary code, or an M-ary modulation sequence over any arbitrary size of modulation alphabet.

3. The encoding system according to claim 1, wherein the sequence of symbols comprises at least 1000 bits.

4. The encoding system according to claim 3, wherein the encoding system assigns the sequence of symbols to two or more tributaries to mark two or more channels of a coherent transmission system.

5. The encoding system according to claim 1, wherein the digital code generator comprises a linear feedback shift register.

6. The encoding system according to claim 1, wherein the encoding system comprises a summing element that combines the sequence of symbols with the modulated data signal to generate phase-shift-encoded digital codes.

7. A waveform detector for identifying phase and polarization in a coherent transmission system, the waveform detector comprising:
    a correlation peak detector that, in response to receiving quadrature channel data and a digital code associated with the quadrature channel data, generates a correlation function;
    a phase rotation detector that uses the correlation function to determine correlation data comprising signs of correlation peaks and obtain therefrom phase rotation data in one or more quadrature channels; and
    a reference pattern detector that uses the correlation function to obtain a mapping comprising correlation peaks, the mapping indicating whether polarization channels in the quadrature channel data have been swapped.

8. The waveform detector according to claim 7, further comprising a remapping circuit that, in response to receiving at least the mapping, remaps the quadrature channel data to a set of data streams.

9. The waveform detector according to claim 8, wherein the remapping circuit comprises a decision circuit that uses threshold detection to identify the set of data streams.

10. The waveform detector according to claim 7, the correlation data being applied to the reference pattern detector to obtain the mapping.

11. The waveform detector according to claim 7, the correlation peak detector comprises a set of matched filters.

12. The waveform detector according to claim 11, wherein the set of matched filters comprises a set of FIR filters that use the digital code as a set of tap weights to a perform peak detection.

13. The waveform detector according to claim 7, further comprising a lookup table coupled to the phase rotation detector and the reference pattern detector, the lookup table storing the phase rotation data.

14. A method for identifying phase and polarization in a coherent transmission system, the method comprising:
    in response to receiving quadrature channel data that have been labeled with a digital code, generating a correlation function;
    using the correlation function to determine correlation data comprising signs of correlation peaks and obtain therefrom phase rotation data in one or more quadrature channels; and
    using the correlation function to obtain a mapping comprising correlation peaks, the mapping indicating whether polarization channels in the quadrature channel data have been swapped.

15. The method according to claim 14, further comprising, in response to receiving at least the mapping, remapping the quadrature channel data to a set of data streams.

16. The method according to claim 15, further comprising, using a threshold detection circuit to identify the set of data streams.

17. The method according to claim 14, applying the correlation data to a reference pattern detector to obtain the mapping.

18. The method according to claim 14, wherein the digital code has been generated by an encoder that, in response to receiving a modulated data signal, combines the digital code with the modulated data signal to generate labeled quadrature channel data.

19. The method according to claim 14, wherein the digital code comprises at least one of a binary pseudo-noise code, a ternary code, or an M-ary modulation sequence over any arbitrary size of modulation alphabet.

20. A coherent transmission system comprising:
a transmitter comprising:
- a digital code generator that generates a sequence of symbols that have a cyclic autocorrelation that substantially approximates an impulse function; and
- a combiner that combines a modulated data signal with the sequence of symbols to label the polarity and identity of the modulated data signal to output labeled modulated data signals; and a receiver comprising:
- a correlation peak detector that, in response to receiving the labeled modulated data signals, generates a correlation function;
- a phase rotation detector that uses the correlation function to determine correlation data comprising signs of correlation peaks and obtain therefrom phase rotation data in one or more quadrature channels; and
- a reference pattern detector that uses the correlation function to obtain a mapping comprising correlation peaks, the mapping indicating whether polarization channels have been swapped.

* * * * *